United States Patent
Popovic et al.

(10) Patent No.: US 10,750,505 B2
(45) Date of Patent: *Aug. 18, 2020

(54) METHOD FOR ARRANGING TRANSMISSIONS ON A DOWNLINK CARRIER

(71) Applicant: HUAWEI TECHNOLOGIES CO., LTD., Shenzhen (CN)

(72) Inventors: Branislav Popovic, Kista (SE); Fredrik Berggren, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/192,056

(22) Filed: Nov. 15, 2018

(65) Prior Publication Data

US 2019/0090244 A1 Mar. 21, 2019

Related U.S. Application Data

(63) Continuation of application No. 15/231,257, filed on Aug. 8, 2016, now Pat. No. 10,154,494, which is a
(Continued)

(51) Int. Cl.
*H04W 72/04* (2009.01)
*H04L 5/00* (2006.01)

(52) U.S. Cl.
CPC ....... *H04W 72/0453* (2013.01); *H04L 5/0044* (2013.01); *H04L 5/0048* (2013.01)

(58) Field of Classification Search
None
See application file for complete search history.

(56) References Cited

U.S. PATENT DOCUMENTS 9,432,995 B2 * 8/2016 Popovic ............... H04L 5/0044
10,154,494 B2 * 12/2018 Popovic ............... H04L 5/0044
(Continued)

FOREIGN PATENT DOCUMENTS

CN 101640890 2/2010
CN 101640890 A 2/2010
(Continued)

OTHER PUBLICATIONS

3GPP TS 36.213 V10.1.0 (Mar. 2011),3rd Generation Partnership Project;Technical Specification Group Radio Access Network;Evolved Universal Terrestrial Radio Access (E-UTRA);Physical layer procedures(Release 10),total 115 pages.
(Continued)

*Primary Examiner* — James P Duffy
(74) *Attorney, Agent, or Firm* — Fish & Richardson P.C.

(57) ABSTRACT

A method is provided for arranging transmissions on a downlink carrier c, spanning a frequency range Fc, in a mobile radio communications system, wherein a bandwidth of Fc belongs to a set of predefined channel bandwidths in the communications system, and wherein the carrier c comprises a reference signal defined in the communications system. A configurable frequency range $F_{RS}$ comprising a set of time-frequency resources for comprising the reference signal of the carrier c is provided. Information associated with the configuration of the frequency range $F_{RS}$ is signaled to a receiver in the communications system, such that c can be deployed over a frequency range F smaller than Fc when the frequency range $F_{RS}$ is configured within F and any other transmissions on the carrier c are arranged to be within F.

24 Claims, 3 Drawing Sheets

Related U.S. Application Data continuation of application No. 14/112,432, filed as application No. PCT/CN2011/072941 on Apr. 18, 2011, now Pat. No. 9,432,995.

(56) References Cited

U.S. PATENT DOCUMENTS

| | | | |
|---|---|---|---|
| 2008/0232492 | A1 | 9/2008 | Xiao et al. |
| 2011/0244877 | A1 | 10/2011 | Farajidana et al. |
| 2012/0120903 | A1 | 5/2012 | Kim et al. |

FOREIGN PATENT DOCUMENTS

| | | |
|---|---|---|
| WO | 2009/149565 | 12/2009 |
| WO | 2009149565 A1 | 12/2009 |
| WO | 2010035067 A2 | 4/2010 |
| WO | 2010/049754 | 5/2010 |
| WO | 2010049754 A1 | 5/2010 |
| WO | 2010/088970 | 8/2010 |
| WO | 2010088970 A1 | 8/2010 |

OTHER PUBLICATIONS

European Search Report for European Application No. 11863825.3 dated Jun. 6, 2014.
International Search Report for PCT/CN2011/072941 dated Feb. 9, 2012.
Office Action dated Sep. 15, 2015 in U.S. Appl. No. 14/112,432 (24 pages).
Final Office Action dated Jan. 20, 2016 in U.S. Appl. No. 14/112,432 (23 pages).
Notice of Allowance Action dated Apr. 25, 2016 in U.S. Appl. No. 14/112,432 (5 pages).
International Search Report dated Feb. 9, 2012, in corresponding International Application No. PCT/CN2011/072941.
$3^{rd}$ Generation Partnership Project; Technical Specification Group Radio Access Network; Evolved Universal Terrestrial Radio Access (E-UTRA); Physical layer procedures (Release 10), 3GPP TS 36.213 V10.1.0, Mar. 2011, pp. 1-115.
International Search Report, dated Feb. 9, 2012, in corresponding International Application No. PCT/CN2011/072941 (7 pp.).
Written Opinion of the International Searching Authority, dated Feb. 9, 2012, in corresponding International Application No. PCT/CN2011/072941 (5 pp.).
Supplementary European Search Report dated Jun. 4, 2014 in corresponding European Patent Application No. 11863825.3 (3 pp.).
Office Action dated Nov. 17, 2016 in U.S. Appl. No. 15/231,257.
Final Office Action dated May 12, 2017 in U.S. Appl. No. 15/231,257.
Office Action dated Oct. 16, 2017 in U.S. Appl. No. 15/231,257.
Final Office Action dated Apr. 26, 2018 in U.S. Appl. No. 15/231,257.
Notice of Allowance Action dated Aug. 8, 2018 in U.S. Appl. No. 15/231,257.
U.S. Appl. No. 14/112,432, filed Dec. 27, 2013, Popovic et al., Huawei Technologies Co., Ltd.
U.S. Appl. No. 15/231,257, filed Aug. 6, 2018, Popovic et al., Huawei Technologies Co., Ltd.
Extended European Search Report issued in European Application No. 19199082.9 dated Mar. 30, 2020, 8 pages.
Motorola, "Extension carrier operation," 3GPP TSG RAN WG2 Meeting #68, R2-096875; Jeju, Korea, Nov. 9-13, 2009, 4 pages.

\* cited by examiner

METHOD FOR ARRANGING TRANSMISSIONS ON A DOWNLINK CARRIER

CROSS-REFERENCE TO RELATED APPLICATIONS

This application is a continuation of U.S. patent application Ser. No. 15/231,257, filed on Aug. 8, 2016, which is a continuation of U.S. patent application Ser. No. 14/112,432, filed on Dec. 27, 2013, now U.S. Pat. No. 9,432,995, which is a National Stage of International Application No. PCT/CN2011/072941, filed on Apr. 18, 2011. All of the aforementioned patent applications are hereby incorporated by reference in their entireties.

FIELD OF THE INVENTION

Embodiments of the invention concern a method for arranging transmissions on a downlink carrier in a mobile radio communications system. Further, they concern a radio base station and a mobile terminal.

BACKGROUND ART

A wireless cellular communication system typically comprises one or several radio carriers on which information is transmitted. The bandwidth of a radio carrier would have to be chosen such that it can be accommodated within the spectrum resources the system operator has at its disposal. The spectrum allocated to a certain system operator is often a consequence of national regulatory decisions and may be technology neutral.

Unfortunately, the carrier bandwidths that radio communications systems can provide have always limited flexibility. For example, the 3GPP Long Term Evolution (LTE) standard (E-UTRA) uses Orthogonal Frequency Division Multiplex (OFDM) transmission which in principle allows for very flexible transmission bandwidth by configuring a suitable number of OFDM subcarriers. However, for each bandwidth configuration it is needed to specify performance requirements for various channels, spectral masks for out-of-band emissions, test cases for transmitters and receivers, etc, which increases the cost and complexity of the equipment. Thus making a large number of bandwidth configurations specified by a standard is not practical. This is the reason why only six channel bandwidths are currently supported in LTE: 20, 15, 10, 5, 3 and 1.4 MHz.

In a number of real-life LTE deployment cases it has been already noticed that these bandwidths do not perfectly match the spectrum allocations available to the operators. For example, if 19 MHz is available, the largest single-carrier LTE bandwidth that can be deployed is 15 MHz. The remaining 4 MHz can either not be used for LTE or can be partially used by deploying an additional LTE carrier with 3 MHz carrier bandwidth. Multiple carriers can be aggregated for transmission and reception to one user. This co-called carrier aggregation solution is specified in Rel. 10 of the LTE standard, which however demands special categories of mobile terminals. If a terminal is not capable of carrier aggregation, it would have to use either the 3 MHz or the 15 MHz carrier, which will limit its maximum throughput.

The additional problem for the operators is that not all carrier bandwidths are supported by the LTE standard in all frequency bands, so carrier aggregation will not always be possible. In the given example a 3 MHz LTE carrier might not be possible to deploy in the remaining spectrum because all the carrier bandwidths are not defined in all frequency bands. Even if carrier aggregation is used as in the above example, there could still be left-over spectrum that is not used, so this obviously is not the most efficient solution. Thereto, with carrier aggregation, parts of the spectrum have to be used as guard band between carriers.

Introducing new transmission bandwidth configurations could provide a way to use the available bandwidth more efficiently. However, setting aside the issues with standardization and testing, it would also be a problem to determine suitable values for new bandwidth configurations that would fit most system deployments worldwide. It should also be noted that new bandwidth configurations will not be accessible to terminals presently in use, but only to terminals of releases of the system, for which the new bandwidth configuration has been introduced. Hence, introducing new transmission bandwidth configurations poses problems for system operators that already have deployed a system, as different carriers will be accessible to terminals of different system releases.

Two types of solutions for improving the spectrum utilization have been proposed in the past for the prior art LTE system: carrier segments and extension carriers.

The carrier segments are contiguous bandwidth extensions to a normal LTE carrier. This solution implies that the normal LTE carrier bandwidth is smaller than the available amount of spectrum, so that the segments can be deployed in the remaining parts. The segments can be used either for user data transmission or for the transmission of some new control channels that might be defined in the future releases of the standard. The sum of the channel bandwidths of the normal LTE carrier and the segments cannot be larger than 20 MHz, because one control channel (located on the normal LTE carrier) is used for scheduling transmission on both the normal LTE carrier and the segments, while the control channel of the normal LTE carrier cannot handle resource allocation for larger channel bandwidths. Since only one control channel is used, only one Hybrid Automatic Repeat reQuest (HARQ) process is utilized, and the same transmission mode is used on the segment as on the normal LTE carrier. It has been proposed that the size of the segments is limited to be the same as the channel bandwidths supported in LTE; 20, 15, 10, 5, 3 and 1.4 MHz.

The extension carrier is defined as a supplementary component carrier to the normal LTE carrier, which serves only for user data traffic transmission. The corresponding control information is transmitted over the control channels allocated on a normal LTE carrier. It was also suggested that an extension carrier or a carrier segment does not include broadcast channels, synchronization signals and the common reference signals (CRS). It means that extension carrier cannot be operated stand-alone and must be part of carrier aggregation. As opposed to carrier segments, there is no restriction on the sum of normal LTE carrier bandwidth and extension carrier bandwidth, except that each of them can be at most 20 MHz. Furthermore, an extension carrier does not need to be located contiguously to the normal LTE carrier. The extension carrier is scheduled from the normal LTE carrier but using a separate control channel, i.e., there is a separate control channel for scheduling transmissions on an extension carrier and another one for scheduling transmissions on a normal LTE carrier. Since the extension carrier has a separate control channel, it also has a separate HARQ process, and different transmission modes can be used on the extension carrier and the normal LTE carrier. It has been proposed that the extension carrier bandwidth can be configured the same as the channel bandwidths supported in LTE; 20, 15, 10, 5, 3 and 1.4 MHz.

However, when the bandwidth of an available spectrum resource does not match a combination of supported bandwidths, there is still a waste of such spectrum resources that will be left unused. For instance, in the case of LTE, a spectrum resource of 19 MHz configured with a component carrier of 15 MHz and a carrier segment or extension carrier of 3 MHz still leaves 1 MHz unused.

SUMMARY OF THE INVENTION

It is an object of the present invention to propose a solution for or a reduction of the problems of prior art. A main object is consequently to provide for a better usage of available spectrum resources for radio communications systems.

According to the invention this is accomplished with a method for arranging transmissions on a downlink carrier c, spanning a frequency range $F_c$, in a mobile radio communications system, wherein a bandwidth of $F_c$ belongs to a set of predefined channel bandwidths in the communications system, and wherein the carrier c comprises a set of reference signals defined in the communications system. The method is distinguished by:

providing a configurable frequency range $F_{RS}$ comprising a set of time-frequency resources for comprising the reference signals of the carrier c, and signalling information associated with the configuration of the frequency range $F_{RS}$ to a receiver in the communications system.

The method enables the carrier c to be deployed over a frequency range F that is smaller than $F_c$ when:

the frequency range $F_{RS}$ is configured within F and any other transmissions on the carrier c are arranged to be within F.

Thus, it is realized that to maximize the spectrum utilization and deployment flexibility of the system, it is desirable that radio carriers could have scalable bandwidth. Thereby, the carrier could fit into the available spectrum resource while minimizing any unused amount of frequency resources.

Therefore, the invention increases the bandwidth scalability within a current set of supported transmission bandwidth configurations.

The method of the invention increases the bandwidth scalability of a carrier, where the bandwidth of the carrier belongs to a set of configured bandwidth configurations. The method allows for deploying a carrier with a bandwidth that is larger than the bandwidth available and using data scheduling to control the spectral containment of the signal. The invention discloses a method using a downlink carrier on which cell-specific reference signals can be configured with a bandwidth being smaller than the carrier bandwidth.

In one embodiment, the bandwidth of the reference signal is located symmetrically around the center frequency of the carrier.

In one embodiment, the bandwidth of the reference signal is located asymmetrically around the center frequency of the carrier.

In one embodiment, the reference signal is transmitted on a set of non-contiguous time-frequency resources.

Two embodiments are disclosed for arranging signalling pertaining to the time-frequency resources of the reference signal:

Signalling of time-frequency reference resources for channel quality reporting

Signalling of time-frequency resources for reference signal transmission.

Furthermore, the invention discloses embodiments for signalling of time-frequency resources of reference signal according to either;

The time-frequency positions on which the reference signal is transmitted, or the time-frequency positions on which the reference signal is not transmitted.

The invention also comprises a radio base station and a mobile terminal having advantages corresponding to those of the method of the invention.

Further advantageous embodiments are disclosed in the remaining dependent claims.

BRIEF DESCRIPTION OF THE DRAWINGS

Embodiments exemplifying the invention will now be described, by means of the appended drawings, in which.

DETAILED DESCRIPTION OF THE INVENTION

In the following embodiments of the invention are discussed, often in the context of a Long Term Evolution (LTE) mobile communications system. It should be noted that any such reference to LTE should be considered as an example intended to elucidate the invention. The invention itself is applicable to any mobile radio communications system with the right prerequisites, as discussed below.

The prior art solutions of extension carrier and carrier segments open up for more flexible usage of the available spectrum. However, a major limitation would occur if these new carrier types also would be confined to a small set of bandwidths. In that case, the bandwidth granularity is not straightforwardly increased. According to the previous example, if 19 MHz is available, a 15 MHz extension carrier may need to be deployed, possibly combined with aggregation of a 3 MHz carrier. Hence, the efficient use of available bandwidth is still a problem of the prior art solutions.

Figure 1:
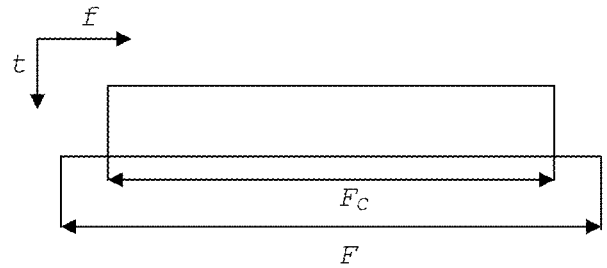
FIG. 1 illustrates an example where a carrier with frequency range $F_C$ is smaller than the available frequency range F.

Suppose a frequency range is defined as a set of frequencies in the frequency spectrum and that the bandwidth of such a frequency range denotes the difference between the largest and smallest frequency comprising the frequency range. FIG. 1 shows an example where a frequency range F is available and a carrier (e.g., an extension carrier) with a frequency range $F_C$ is deployed, such that the bandwidth of $F_C$ is smaller than or equal to the bandwidth of F. The bandwidth of $F_C$ may be the largest supported bandwidth being smaller than or equal to the bandwidth of F. Typically, this would leave at least $B-B_c$ Hz of spectrum unutilized, where B is the bandwidth of frequency range F and $B_c$ is the bandwidth of the frequency range $F_c$. FIG. 1 illustrates the principle of prior art, where the carrier frequency range must be chosen to have a bandwidth being smaller than the bandwidth of the available frequency range.

In this invention, it is realized that the frequency range granularity can be improved by deploying a carrier in a frequency range that has a bandwidth which is larger than the bandwidth of an available frequency range and arrange the transmissions on the carrier such that the actually used frequency resources are within the available frequency range.

Figure 2:
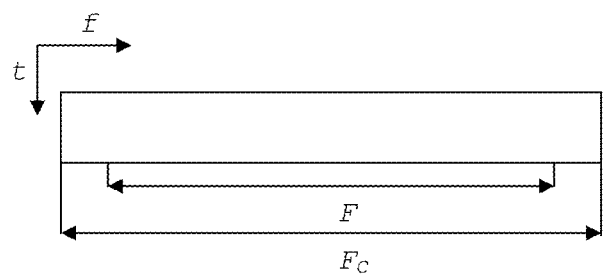
FIG. 2 illustrates an example where a carrier with frequency range $F_C$ is larger than the available frequency range F.

FIG. 2 shows an example where a frequency range F is available and a carrier with a frequency range $F_C$ is deployed, such that the bandwidth of $F_C$ is larger than the bandwidth of F.

In order to realize the implications of this idea for a real life communications system, a note on control channels and reference signals may be helpful. Any such channel or signal of the carrier should be confined to the available spectrum resource rather than to whole of the (larger) carrier itself. Control channels are discussed in the following, as an example for a Long Term Evolution (LTE) system, and then reference signals are discussed.

In LTE, the time-frequency region onto which data (i.e., Physical Downlink Shared Channel, PDSCH) is mapped is referred to as resource blocks, where a resource block is defined as a first number of consecutive OFDM symbols in the time domain and a second number of subcarriers in the frequency domain. The bandwidth of a resource block is 180 kHz and a carrier can contain up to 110 resource blocks. Six transmission bandwidth configurations are supported, comprising 100, 75, 50, 25, 15 and 6 resource blocks, respectively, corresponding to the channel bandwidths 20, 15, 10, 5, 3 and 1.4 MHz. The transmission bandwidth configuration of a carrier is broadcast to the mobile terminal, named User Equipment (UE) in LTE.

The first 1 to 3 OFDM symbols in a subframe of an LTE downlink component carrier contain the control channels (e.g., Physical Downlink Control Channel (PDCCH), Physical Control Format Indicator Channel (PCFICH), Physical Hybrid ARQ Indicator Channel (PHICH)). The PDCCH contains downlink assignments for the PDSCH and uplink grants for the Physical Uplink Shared CHannel (PUSCH). The PCFICH determines the number of OFDM symbols available for the control channels. The PHICH is used for HARQ ACK/NACK feedback for the uplink. These channels may be transmitted over the whole carrier bandwidth, which in that case would interfere with the concept of the invention. In LTE Rel-10, carrier aggregation is supported such that a UE can simultaneously receive data on multiple downlink component carriers. The control channels may be transmitted on a different carrier than on which the data is transmitted. This is referred to as cross-carrier scheduling. Since cross-carrier scheduling is configured per UE, all component carriers in LTE Rel-10 still contain a control region, since other UEs may be scheduled data on the carrier without cross-carrier scheduling.

There are some measures available in order to arrange the control channels to be within the available spectrum resource, discussed later in the detailed description.

Now, considering reference signals it must be realized that they are ordinarily transmitted over a whole frequency range of a downlink carrier and would therefore interfere with the working principle of the invention—to employ a carrier over a smaller available spectrum resource and abstaining from transmissions in certain frequency regions of the carrier—if no measures were taken to confine the reference signals to the available spectrum resource. Some properties of reference signals are described, as an example, for an LTE system below.

A number of different reference signals are transmitted on an LTE carrier, including:

Common reference signal (CRS)

These are cell-specific and are used for obtaining channel estimates for the control and data channels, for channel quality measurements to be reported in the uplink and for mobility procedures. The CRS is transmitted over the whole carrier bandwidth, i.e., in all resource blocks.

Channel state information reference signal (CSI-RS)

These are cell-specific and are used for obtaining channel quality measurements to be reported in the uplink. The CSI-RS is transmitted over the whole carrier bandwidth, i.e., in all resource blocks.

Demodulation reference signal (DM-RS)

These are UE-specific and are only used for obtaining channel estimates for data demodulation of the PDSCH. The DM-RS is only transmitted in the same resource blocks that contain the scheduled data, i.e., where the PDSCH is for the UE.

Either a CRS or CSI-RS has to be present on a carrier in order to support channel quality reporting. This implies that there will be at least one reference signal which is allocated over the whole bandwidth of either carrier segment or extension carrier. However, the bandwidth of reference signals in LTE is the same as the bandwidth of the carrier, which means that the bandwidth of a carrier may not match the available spectrum if the reference signals are according to the prior art LTE system.

With the properties of reference signals in mind, the invention could now in a basic embodiment be described as a method for arranging transmissions on a downlink carrier c, spanning a frequency range $F_c$, in a mobile radio communications system. In this context, the carrier spanning a frequency range means that the carrier occupies this range of frequencies in the radio spectrum where it is transmitted. Further, a bandwidth of $F_c$ belongs to a set of predefined channel bandwidths in the communications system, and wherein the carrier c comprises a set of reference signals defined in the communications system.

The method is distinguished by:
providing a configurable frequency range $F_{RS}$ comprising a set of time-frequency resources for comprising the reference signals of the carrier c, and
signalling information associated with the configuration of the frequency range $F_{RS}$ to a receiver in the communications system.

In this way, it is possible that the carrier c can be deployed over a frequency range F that is smaller than $F_c$ when the frequency range $F_{RS}$ is configured within F and any other transmissions on the carrier c are arranged to be within F.

So the method opens up the possibility of deploying a downlink carrier over an available frequency range that is smaller than the frequency range of the carrier itself, since the frequency range of the reference signals of the carrier is configurable to not fill the whole frequency range of the carrier. Thus, the reference signals could be configured to be confined to the available frequency range. Therefore, all of the available spectrum frequency range could be utilized, even if its bandwidth does not correspond to any in the set of predefined channel bandwidths in the communications system.

Thus, the method of the invention could in one embodiment further comprise to:
configure the frequency range $F_{RS}$ to be within F, and
arranging any other transmissions on the carrier c to be within F. Thereby, making use of the configurability of the frequency range of the reference signals.

The bandwidth of $F_C$ may be a supported channel bandwidth being not smaller than the bandwidth of F, e.g., the smallest such supported channel bandwidth Thus, further according to the method of the invention, the bandwidth of $F_c$ is a supported bandwidth, from the set of predefined channel bandwidths, being not smaller than the bandwidth of F. The carrier could then be operated such that transmissions should not occur outside the frequency range F. Thereby, spectrum may not be unutilized.

As described previously, specifying new transmission bandwidth configurations in a system may be complicated; it is desirable to allow bandwidth scalability with other means. The bandwidth scalability of a carrier is limited if there are channels or signals that occupy the whole carrier bandwidth. In LTE, this includes the control channels and reference signals. In this invention, it is realized that bandwidth scalability can be facilitated by frequency domain scheduling of data together with a carrier that does not require transmission of other signals and channels over the whole bandwidth. Since user data is subject to frequency domain scheduling, it is possible to perform transmissions on any desirable frequency resources, e.g., the central parts of the carrier. Hence, it would be possible by proprietary means (i.e., scheduler design) to accommodate the carrier in the available spectrum resource.

Figure 3:
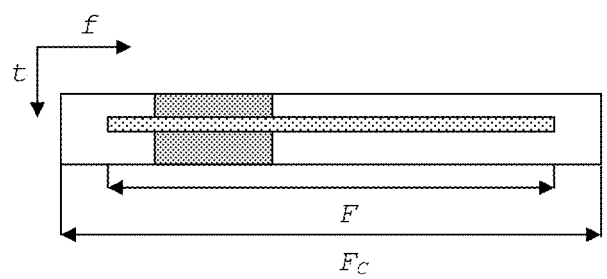
FIG. 3 illustrates an example where data (grey) is scheduled within frequency range F and where the frequency range of the reference signal (dotted) is smaller than $F_C$.

FIG. 3 shows an example where a frequency range of F is available and a carrier with a frequency range $F_C$ is deployed, where the bandwidth of $F_c$ is larger than the bandwidth of F. The bandwidth of $F_C$ may be a supported channel bandwidth being not smaller than the bandwidth of F. The bandwidth of the cell-specific reference signal is configured to a frequency range $F_{RS}$ having a bandwidth that is equal to the bandwidth of the frequency range F and data is scheduled within the same frequency range. This will minimize the amount of unused spectrum given a set of supported transmission bandwidth configurations. There is thus an advantage to the system operator as the spectrum resource can be fully utilized even if there is no bandwidth configuration that exactly matches the frequency range F.

In prior art LTE it is required that cell-specific reference signals are transmitted over the whole downlink carrier bandwidth. More precisely, the reference signals are transmitted in all resource blocks comprising the carrier. It is here disclosed a method where the frequency range of the cell-specific reference signals (e.g., CSI-RS) is adjustable and the bandwidth of this frequency range is less than the carrier bandwidth. This is well suited for use with an extension carrier or carrier segments, since they may not contain any other signals or channels that cover the whole carrier bandwidth.

Figure 4:
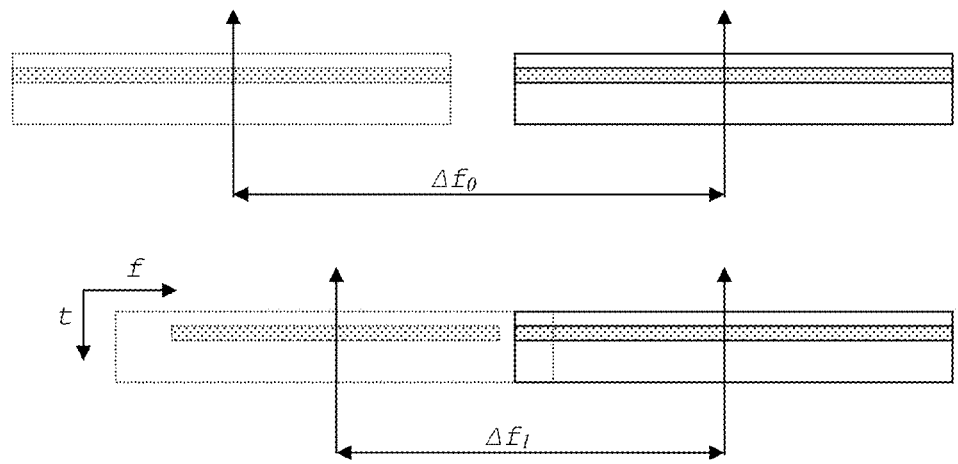
FIG. 4 illustrates an example of two non-overlapping carriers (top) and two overlapping carriers (bottom)

The method further allows for compact deployments of carriers and more efficient use of the spectrum resources. The traditional way of arranging contiguous radio carriers is to separate their carrier frequencies sufficiently far apart in order to make a guard band between the carriers. This means that two carriers with bandwidths $B_1$ and $B_2$ should have their carrier center frequencies separated by at least $\Delta f \geq (B_1 + B_2)/2$. This is illustrated in the top of FIG. 4, where the separation is $\Delta f_0$. One particular feature of this invention is that it allows overlapping of carriers. Overlapping here implies that a spectrum resource could contain transmissions from either of two carriers. This is illustrated in the bottom of FIG. 4, where the left carrier has adjusted its transmission bandwidth of the reference signal to be less than the carrier bandwidth. This allows that the two carriers could be deployed with a smaller separation, $\Delta f_1 < \Delta f_0$ and $\Delta f_1 < (B_1 + B_2)/2$. Thus, in terms of the method according to the invention, it is possible to further configure the frequency range $F_c$ of carrier c overlapping with a frequency range of at least one other carrier. The adjustment of the reference signal bandwidth and proper data scheduling would assure that no transmissions of signals or channels from the left carrier coincide with transmissions on the right carrier. In principle, the data scheduling could be done independently per carrier, given that the set of overlapping resources is known to the schedulers of both carriers and are prohibited to be used for one of the schedulers. In more advanced cases, joint scheduling could be performed on both carriers. Thus, larger bandwidth scalability has been achieved and a person skilled in the art may configure the reference signal frequency ranges on carriers such that carriers can overlap and be separated sufficiently close in order to fit into the available spectrum resource. This is typically practical for a set of contiguous carriers, since time-frequency synchronization can be maintained between carriers as to uphold the orthogonality of the signal transmissions. For this, in an OFDM system, the separation $\Delta f$ may be a multiple of the subcarrier spacing. Additionally, if the carrier center frequencies are constrained to be located on a pre-defined frequency raster, the separation may also be a multiple of the raster resolution.

Figure 5:
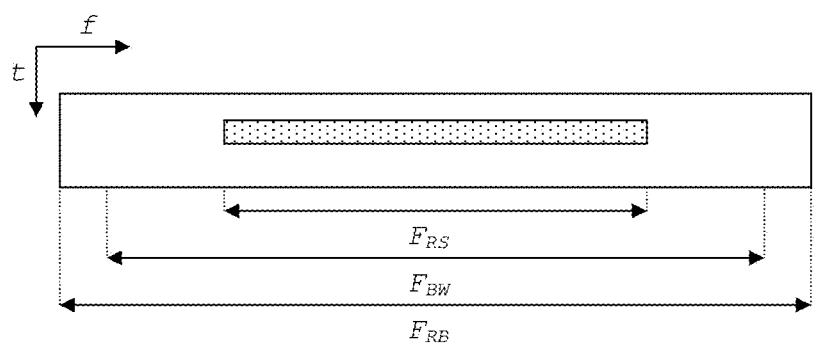
FIG. 5 illustrates an example of a carrier where the cell-specific reference signal has a frequency range ($F_{RS}$) smaller than the carrier frequency range ($F_{RB}$)

The method enables that the effective carrier bandwidth can be adjusted by decreasing the bandwidth of the reference signals. Thereby the carrier can be deployed in the available spectrum and frequency domain scheduling assures that transmissions only occur on resources that are available to the system operator. The outer parts of the carrier can thus be left unused and thereby act as guard bands. FIG. 5 shows one example where a carrier with a frequency range $F_{RB}$ corresponding to $N_{RB}$ resource blocks is deployed on a spectrum resource having a frequency range $F_{BW}$ corresponding to $N_{BW}$ resource blocks. As seen, FIG. 5 is an example where the resource blocks comprising the reference signals are contiguously distributed in the frequency range $F_{RS}$ corresponding to $N_{RS}$ resource blocks. The reference signal comprises $N_{RS} < N_{RB}$ resource blocks. The skilled reader can interchangeably use the notion of frequency range instead of resource block, whenever appropriate, or use any other entity characterizing the spectral containment of a signal. The bandwidth of a frequency range denotes the width of the range in Hertz. The above descriptions related to FIG. 1-3 also apply if the terminology and notation of resource block is used instead of frequency range, wherein it is understood that the configuration of a frequency range comprising time-frequency resources for comprising reference signals, can be achieved by configuring the number of resource blocks comprising reference signals.

This would give freedom to a person skilled in the art to configure the frequency range $F_{RS}$ such that the spectral containment of the signal of the carrier adheres to suitable emission requirements applicable to the frequency range $F_{BW}$. The skilled person in the art would also assure that the signal adheres to suitable emission requirements by proper data scheduling. The disclosed method therefore provides an advantage in that the need for new transmission bandwidth configurations decreases while the spectrum scalability is provided by proper data scheduling and reference signal bandwidth configuration. In a typical case, data scheduling is confined to the frequency range defined by the reference signal.

It is noted that there may exist other channels (e.g., control channels) on the carrier that have a frequency range less than $F_{RS}$. It is even possible that some control channels are specified on a frequency range larger than $F_{RS}$. In prior art LTE, the actual transmission frequency range of some control channels is a function of the cell identity. By proper assignment of the cell identities, it could be possible to reduce the transmission frequency range of a control channel to be less than the full carrier frequency range, e.g., to be contained within $F_{RS}$. It is noted that such judicious selection of cell identities alone for compressing the control channel frequency range complicates the network planning since the amount of usable cell identities decreases and it does not provide full frequency range scalability since the frequency range of the common reference signals cannot by adjusted by any means in prior art LTE.

The disclosed method is applicable on a single carrier as well as for carrier aggregation. The method according to the invention therefore further comprises, in addition to any previous step, configuring the carrier c as an aggregated carrier having a control channel on a separate carrier in the communications system. For example, it can be combined with any of the prior art solutions extension carrier or carrier segments. For the extension carrier, the associated control channels are located on a different carrier and therefore the bandwidth scalability is not constrained by the bandwidth of the control channel. For carrier segments, the associated control channels are located on the normal LTE carrier which can be assumed to fit into the frequency range and therefore the bandwidth scalability is not constrained by the bandwidth of the control channel.

LTE also includes support for relays and for the communication between the base station (eNodeB) and the relay node, a special control channel has been defined, i.e., the R-PDCCH, which can be transmitted in certain subframes. As opposed to the PDCCH, the R-PDCCH is transmitted on a configurable set of resource blocks and in OFDM symbols located after the normal control region. It therefore does not need to be transmitted over the whole carrier bandwidth. The standard allows for transmitting the R-PDCCH in a non-interleaved manner such that only one R-PDCCH would be contained in these resource blocks. This allows for using the DM-RS for R-PDCCH reception. However, CRS must still be transmitted in the normal control region of the subframe.

In a further example, it is realized that the disclosed method is applicable on a single carrier for which control channels are not defined over the whole carrier bandwidth. This could be enabled by control channels that can be detected by means of UE-specific demodulation reference signals, which therefore can be transmitted on part of the carrier bandwidth. For example, a channel similar to the R-PDCCH in prior art relay LTE system, could be applied on a carrier for arranging transmissions instead directly between the eNodeB and the UE, and be combined with the disclosed method of a CSI-RS being configured on less than the full carrier bandwidth.

The notion of reference signals for which the frequency range is adjustable in the context of this invention is understood to include reference signals that can be transmitted on frequency resources located outside the actual frequency resources used for data transmission. In prior art system LTE, this includes the CRS and the CSI-RS, but does not include the DM-RS. It is noted that the signalling for configuration of such reference signals may be by dedicated or by broadcast signalling. The prior art LTE system also includes reference signals for broadcasting (MBSFN) and positioning (PRS), which are transmitted over the whole carrier bandwidth. Thus, the invention could apply also to these reference signals.

Figure 6:
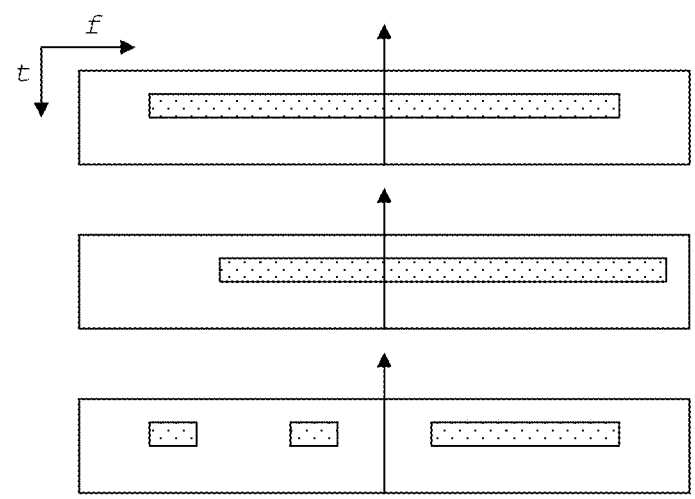
FIG. 6 illustrates symmetrically located reference signal (top), asymmetrically located reference signal (middle) and non-contiguous reference signal (bottom) wherein the bandwidth of the reference signal is smaller than the carrier bandwidth.

In one embodiment, the frequency range of the reference signal is symmetrically divided around the center frequency of the carrier, as shown in FIG. 6 (top). This symmetry may simplify the signalling associated with the frequency range of the reference signal.

In another embodiment, the frequency range of the reference signal is asymmetrically divided around the center frequency of the carrier, as shown in FIG. 6 (middle). This allows that different sized guard bands could be provided which could be beneficial for contiguous carrier aggregation, i.e., when aggregated carriers are located next to each other in frequency. A smaller guard band is typically needed between two carriers that are time- and frequency synchronized. Since the carrier frequency often is required to coincide with a certain frequency raster, carriers cannot be arbitrarily placed in frequency. An asymmetrical reference signal may be advantageous in this case, as it gives the additional freedom to "move" the part of the carrier used for data transmission in any desirable direction. This move may be obtained with larger granularity than offered by the frequency raster.

In one embodiment, the reference signal may be transmitted on non-contiguous time-frequency resources. The set of resources may be comprised of resource blocks, as shown in FIG. 6 (down). This gives the additional merit that the orthogonality between reference signals in different cells can be improved. By avoiding transmitting the reference signal on certain time-frequency resources in one cell, the inter-cell interference is reduced on the same time-frequency resources in another cell. Thus a larger frequency reuse factor is obtained for the reference signal. This would, e.g., be beneficial in cooperative multipoint transmission schemes, where a UE receives data transmitted from multiple cells. For this, a UE typically needs to measure downlink channel qualities from multiple cells and where the respective reference signals should be kept orthogonal.

In one part of the invention, it is realized that the receiver (e.g., a UE) needs to be aware of the time frequency-positions of the reference signals. In prior art LTE system, this is not an issue since both the reference symbols and their time-frequency positions can be deduced from the carrier bandwidth (e.g., the number of resource blocks comprising the carrier). However, in the disclosed invention, additional signalling of the reference signal's time-frequency positions would be needed. Thus it is a problem to arrange transmission of the reference signal such that the associated signalling overhead is kept small.

Granularity of the Reference Signal Bandwidth

In an OFDM system, the most detailed information describing the time-frequency position of a reference signal would be to directly indicate which subcarriers are used for the reference signal. In prior art LTE, a resource block is the smallest time-frequency entity to which a data channel can be mapped. Therefore, it is realized in one embodiment that the amount of signalling can be reduced by restricting the reference signal bandwidth to be a multiple of the smallest time-frequency entity on which a data channel can be mapped, e.g., a resource block. Therefore, the method according to the invention may further comprise restricting a bandwidth of the frequency range $F_{RS}$ comprising the reference signals to a multiple of a smallest time-frequency entity on which a data channel can be mapped in the communications system. Since the reference signal time-frequency pattern within a resource block is known, a complete characterization of the reference signal can be obtained, once the set of resource blocks containing the reference signal is known.

In a further embodiment, the method according to the invention allows for reducing the amount of signalling by further comprising restricting a bandwidth of the frequency range $F_{RS}$ comprising the reference signals to a multiple of a smallest time-frequency entity used for signalling downlink resource allocations in the communications system. In prior art LTE, to reduce the signalling overhead in the downlink control channel for the resource allocation of the PDSCH, resource block groups (RBGs) comprising a set of resource blocks can be used as the smallest entity to which the PDSCH can be mapped. The resource block group size increases with the carrier bandwidth. Therefore, it is possible to indicate which resource block groups contain the reference signal in order to further reduce the signalling pertaining to the reference signal bandwidth.

Another embodiment of the method according to the invention allows for reducing the amount of signalling by restricting the reference signals' frequency range to the time-frequency entities used for channel quality reporting. Thus in this step, the method comprises restricting a bandwidth of the frequency range $F_{RS}$ comprising the reference signals to a multiple of a time-frequency entity used as a reference resource for channel quality reporting in the communications system. In prior art LTE, channel quality measurements obtained from the downlink reference signals can be reported for different bandwidth parts of the carrier. In some reporting modes, a subband, being defined as a set of contiguous resource blocks, is the smallest time-frequency entity for which channel quality measurements can be reported. Thus by letting the bandwidth of the reference signal be a multiple of a subband bandwidth, the signalling can be reduced and the minimum reference signal bandwidth is provided for channel quality reporting.

The two previous embodiments could be combined in case the subband size and the resource block group size are different, for which the reference signal bandwidth should be a multiple of the largest or smallest of the sizes in a pre-determined manner.

A further embodiment realizes that there may be limitations to the carrier bandwidths. For example in prior art LTE, the uplink resource allocation of the data channel (in terms of resource blocks) is a multiple of 2, 3 or 5 in order to reduce the implementation complexity of the terminal. Hence, a restriction may be that the reference signal bandwidth of the downlink should correspond to an allowed resource allocation of an uplink carrier in the system. The method according to the invention may therefore further comprise restricting a bandwidth of the frequency range $F_{RS}$ comprising the reference signals to a multiple of a bandwidth of an allowed resource allocation of an uplink carrier in the communications system.

The UE is supposed to utilize the reference signals for one or several purposes, including channel estimation as well as channel quality based measurements and therefore the time-frequency position of the reference signals needs to be known. This information can be signalled to the UE via broadcast messages or dedicated UE signalling. This can be facilitated by either MAC or RRC signalling. It is understood that for carrier aggregation, such information may not necessarily have to be transmitted through channels located on the same carrier as the reference signal itself is transmitted on.

Two embodiments are disclosed for arranging signalling pertaining to the time-frequency resources of the reference signal:

Signalling of time-frequency reference resources for channel quality reporting

Signalling of time-frequency resources for reference signal transmission

Signalling of Time-Frequency Reference Resources for Channel Quality Reporting

In prior art LTE, the downlink bandwidth (in terms of resource blocks) is divided into a set S of subbands, where a subband is a set of contiguous resource blocks. The subbands in the set S always span the whole carrier bandwidth and therefore the set is not signalled to the UE. Several types of channel quality measures (CQI, PMI, RI) are reported, including measures that apply to all the subbands of set S (e.g., wideband CQI) and those that apply to some of the subbands (e.g., subband CQI) of set S.

In one example, the time-frequency resources (e.g., resource blocks, or set S of subbands) for which the UE is supposed to report channel quality reports are signalled to the UE. The UE may assume that the associated reference signals are transmitted within this signalled reporting bandwidth, which may not be equal to the carrier bandwidth. In other words, the method according to the invention may further comprise implicitly signalling, to a receiver in the communications system, the configuration of the frequency range $F_{RS}$ by signalling of time-frequency resources defined as reference resources for channel quality reporting, wherein the frequency range of the time-frequency resources defined as reference resources for channel quality reporting contains the frequency range $F_{RS}$ with reference signals. Thus, in this embodiment, the bandwidth or the frequency range of the reference signals does not need to be explicitly signalled. The reference signal bandwidth may be larger than the reporting bandwidth. However, the UE is not expected to measure any channel quality outside the reporting bandwidth, e.g., the set S. The person skilled in the art may arrange the transmission of the frequency range of the reference signal such that its bandwidth is larger than or equal to the reporting bandwidth. It could also be possible to relate the bandwidth of the reference signal by some pre-determined rule to the reporting bandwidth, e.g., they could be assumed to always be the same. That is, the reference signal should be transmitted in the subbands comprising set S.

One example is where the location of the subbands comprising the carrier is represented by a bitmap which is signalled to the UE. In this case, the step of implicit signalling of the time-frequency resources defined as reference resources for channel quality reporting would be implemented by signalling of a bitmap, where each bit in the bitmap refers to a time-frequency resource defined as a reference resource for channel quality reporting. A '1' on a certain position in the bitmap may imply that an associated subband should be part of the set S or vice versa.

Signalling of Time-Frequency Resources of Reference Signal

The information related to the frequency range or bandwidth of the reference signals can be describing either;

1. The time-frequency positions on which the reference signals are transmitted, or 2. the time-frequency positions on which the reference signals are not transmitted.

Alternative 1 has a straightforward interpretation while alternative 2 allows a unique determination of the time-frequency positions on which the reference signals are transmitted if combined with information on the total carrier bandwidth. In prior art LTE system, the number of resource blocks of the carrier, $N_{RB}$, is the same as the number of resource blocks comprising the reference signal, $N_{RS}$, and only the value $N_{RB}$ is signalled. In this embodiment, also information is signalled such that the value $N_{RS}$ can be deduced.

In the following, examples are contained exemplifying the above options. It is assumed that the transmission bandwidth configuration is from a set $N_{RB} \in \{N_0, K, N_K\}$ and $N_{RB} \leq N_{RB}^{max,DL}$.

Alternative 1

Thus, the method according to the invention may further comprise signalling, to a receiver in the communications system, the configuration of the frequency range $F_{RS}$. This can be done in accordance with alternative 1 above by signalling the set of time-frequency resources on which the reference signals are transmitted. This alternative can for instance be further implemented in the following ways.

If the position of the reference signal is known to be symmetric around the center frequency, only its bandwidth needs to be signalled. Thus, the signalling of the configuration of the frequency range $F_{RS}$ could be implemented by signalling of the bandwidth of the frequency range $F_{RS}$, when a position of the reference signals is known to be symmetric around the center frequency of the carrier c. By position, it could here be meant the number of resource blocks containing the reference signal. The person skilled in the art can assure that only proper values are assigned such that the reference signal is symmetrically positioned around the center frequency. For example, if the transmission bandwidth configuration is an even number of resource blocks, the reference signal bandwidth should not be an odd number of resource blocks, and vice versa.

In a further example following alternative 1, the information comprises the number of resource blocks $N_{RB} \leq N_{RB}^{max,DL}$ in which the reference signal is transmitted. This can be represented by a signalling format comprising $f(\log_2 N_{RB}^{max,DL})$ bits, where $f(x)$ is the smallest integer not less than x. Using the knowledge on the symmetric location, it is realized that the number of bits could be further reduced by only signalling the one-sided bandwidth of the reference signal. Thus, in this alternative the signalling of the configuration of the frequency range $F_{RS}$ could be implemented by signalling a half of the bandwidth of the frequency range $F_{RS}$, when a position of the reference signals is known to be symmetric around the center frequency of the carrier c. This can be represented by a signalling format comprising $f(\log_2 (N_{RB}^{max,DL}/2))$ bits.

Alternative 1, Asymmetric Reference Signal Bandwidth Around Carrier Center Frequency An asymmetric configuration can be described by signalling the bandwidth of the reference signal and an offset value. Thus, in this alternative the signalling of the configuration of the frequency range $F_{RS}$ could be implemented by signalling of the bandwidth of the frequency range $F_{RS}$ of the reference signals and an offset value from a predetermined frequency of the carrier c. This will uniquely determine the position of the reference signal. The offset value may describe a shift in frequency position of the reference signal bandwidth location with respect to some predefined frequency resource, e.g., the carrier center frequency.

Alternative 1: Non-Contiguous Reference Signal

The time-frequency resources utilized by a non-contiguous reference signal could be described by a bitmap where each bit in the bitmap refers to, e.g., a resource block, a resource block group or a subband. The size of the bitmap is thus dependent on the number of such entities. A positive entry in the bitmap may indicate which entities contain the reference signal or vice versa. In this case, the method according to the invention would further comprise signalling, to a receiver in the communications system, a non-contiguous configuration of the reference signals within the frequency range $F_{RS}$ by signalling of a bitmap, where each bit in the bitmap refers to a time-frequency resource among the set of time-frequency resources utilized or not utilized by the non-contiguous reference signal.

Alternative 2

According to the second alternative above, the method according to the invention would further comprise signalling, to a receiver in the communications system, the configuration of the frequency range $F_{RS}$ by signalling the time-frequency positions on which the reference signals are not transmitted, and signalling information on the total bandwidth of carrier c.

In an example following alternative 2, the information comprises the set of $N_{RB}-N_{RS}$ resource blocks not containing the reference signal. If there is a restriction on the value of $N_{RS} \geq N_{RS}^{min,DL}$, a signalling format may be represented by $f(\log_2 (N_{RB}^{max,DL} - N_{RS}^{min,DL}))$bits. Otherwise, a signalling format could comprise $f(\log_2 N_{RB}^{max,DL})$ bits. Similarly as above, using the symmetric location property, an alternative format can use $f(\log_2 (N_{RB}^{max,DL}/2))$ bits.

Alternative 2: Asymmetric Reference Signal Bandwidth Around Carrier Center Frequency According to Alternative 2, a further example is to signal two values, $N_1$ and $N_2$, representing time-frequency resources (e.g., resource blocks) on the edges of the carrier on which the reference signal is not transmitted. Knowing the carrier bandwidth expressed in number of time-frequency resources $N_{RB}$, the time-frequency position and bandwidth $N_{RS}$ of the reference signal can be determined using the relation $N_{RS}=N_{RB}-N_1-N_2$. Expressed in terms of the method according to the invention, it further comprises signalling, to a receiver in the communications system, the configuration of the frequency range $F_{RS}$ by:

signalling two values, $N_1$ and $N_2$, representing time-frequency resources on the edges of the carrier c on which the reference signal is not transmitted.

A person skilled in the art can generalize any of the above examples to the case for signalling the set of subbands to be used for channel quality reporting instead of signalling the set of resource blocks containing the reference signal.

A person skilled in the art can also utilize the above embodiments such that both the time-frequency resources for channel quality reporting and the time-frequency resources of the reference signals are signalled. For example the set S can be signalled as well as information about the resource blocks containing the reference signal. Thus, the method according would then comprise a combination of any of the steps for signalling channel quality reporting above and any of the steps for signalling the reference signals above, to further comprise signalling, to a receiver in the communications system, both time-frequency resources used as reference resources for channel quality reporting and information directly related to the time-frequency resources of the reference signals.

Backwards Compatibility

If the disclosed method is introduced in an existing system, an issue may be that UEs currently operating in the system are assuming the reference signal is always transmitted over the whole bandwidth of a carrier. Even if signalling related to the bandwidth of the reference signal is introduced, as disclosed above, such signalling cannot be provided to existing UEs. In a further part of the invention, the reference signal is arranged such that backwards compatibility is achieved on a carrier.

The reference signal can be characterized by the time-frequency resources on which it is transmitted and the modulation symbols which are used. In this embodiment, backwards compatibility is provided by configuring a reference signal to use the same time-frequency resources and modulation symbols within a frequency range F of a carrier having a bandwidth B'>B, as in the frequency range F of a carrier having bandwidth B. Thus within a given frequency range, two carriers with different bandwidths may use the same time-frequency resources and modulation symbols for the reference signal. The method according to the invention thus further comprises configuring the reference signals to use the same time-frequency resources and modulation symbols within a frequency range $F_{c2}$ within carrier c, c having a bandwidth larger than a bandwidth of the frequency range $F_{c2}$, as for a carrier c2 spanning the frequency range $F_{c2}$ in the communications system.

An existing UE can thus be signalled a carrier bandwidth B and it will assume the reference signal bandwidth corresponds to B. UEs capable of receiving a reference signal not spanning the whole carrier bandwidth but being larger than bandwidth B, can be signalled a carrier bandwidth B' and additional information on the bandwidth of the reference signal.

In prior art LTE system, the bandwidths B' and B should be chosen such that both correspond either to an even or an odd number of resource blocks. Otherwise, the time-frequency position of the reference signal may not be the same within the bandwidth B.

It should be noted that the method according to any of the previous steps of the invention could be performed wherein the communications system is LTE and the reference signals comprises any of CRS and CSI-RS.

Further, it should be noted that the different steps of the method of the invention described above could be combined arbitrarily with each other as long as there is not inherent contradiction. An inherent contradiction would for instance be signalling that the frequency range of the reference signals is located symmetrically around the center frequency of the of the carrier and at the same time signalling that the same frequency range of the reference signals is located asymmetrically around that carrier. The skilled person would realise which steps could of the method of the invention could be combined with other such steps.

Radio Base Station

The invention also comprises a radio base station in a mobile radio communications system having means for arranging transmissions on a carrier c according to any of the steps of the method of the invention described above. The skilled person has no problems of realising what the means for arranging the transmissions should be. For instance, for sending a radio signal, a radio transmitter is needed. For creating specific signals for transmission a computing device, such as microprocessor or a computer is needed. Computer code is needed to provide the instructions to the computing device etc.

Mobile Terminal

The invention also comprises a mobile terminal having means for receiving transmissions from a radio base station on a downlink carrier c, spanning a frequency range $F_c$, in a mobile radio communications system, wherein a bandwidth of $F_g$ belongs to a set of predefined channel bandwidths in the communications system, and wherein the carrier c comprises a set of reference signals defined in the communications system. It is distinguished by having means to receive signalling information associated with a configuration of a configurable frequency range $F_{RS}$ comprising a set of time-frequency resources for comprising the reference signals of the carrier c.

The mobile terminal according to the invention may further have means to measure a signal quality on at least one time-frequency resource of the configurable set of time-frequency resources comprising the reference signals, and having means to transmit such a signal quality measurement to the radio base station.

In fact, the mobile terminal according to the invention may have means for responding or reacting to any transmission from the radio base station of the invention implementing any step of the method according to the invention. The skilled person realizes how the different means of the mobile terminal, such as the means for receiving transmissions, means for receiving signalling information, means to measure a signal quality, means to transmit a signal quality measurement, means for responding or reacting to any transmission from the radio base station above, would be implemented. As for the radio base station, for sending a radio signal, a radio transmitter is needed. For creating specific signals for transmission a computing device, such as microprocessor or a computer is needed. Computer code is needed to provide the instructions to the computing device. A radio receiver is needed to receive radio signals etc.

Embodiments of the invention are applicable to a single carrier operation as well as carrier aggregation.

Embodiments of the invention are applicable to Frequency Division Duplex (FDD) as well as Time Division Duplex (TDD).

What is claimed is:

1. A method for arranging transmissions on a downlink carrier c spanning a frequency range $F_c$ in a mobile radio communications system, wherein a bandwidth of $F_c$ belongs to a set of predefined channel bandwidths in the communications system, and the carrier c comprises a reference signal defined in the communications system, the method comprising:

receiving, by an apparatus, information associated with a configuration of a frequency range $F_{RS}$, wherein the carrier c is deployed over a frequency range F which is smaller than $F_c$ and within $F_c$ when any other transmissions on the carrier c are arranged to be within F, and $F_{RS}$ is a configurable frequency range which comprises a set of resources for comprising the reference signal of the carrier c; and using, by the apparatus, the information for transmission.

2. The method according to claim 1, wherein $F_{RS}$ is adjusted within F.

3. The method according to claim 1, wherein the carrier c is configured as an aggregated carrier having a control channel on a carrier different from carrier c in the communications system.

4. The method according to claim 1, wherein a bandwidth of the frequency range $F_{RS}$ is restricted to a multiple of a smallest entity used for signalling downlink resource allocations in the communications system.

5. The method according to claim 1, wherein the receiving information associated with the configuration of the frequency range comprises:

receiving signalling of resources defined as reference resources for channel quality reporting, wherein the frequency range of the resources defined as reference resources for channel quality reporting contains the frequency range $F_{RS}$.

6. The method according to claim 5, wherein the signalling of resources defined as reference resources for channel quality reporting is a bitmap, where each bit in the bitmap refers to a resource defined as a reference resource for channel quality reporting.

7. The method according to claim 1, wherein receiving information associated with the configuration of the frequency range $F_{RS}$ comprises one of the following:
  receiving information of the set of resources on which the reference signal is transmitted;
  receiving information of the bandwidth of the frequency range $F_{RS}$, when a position of the reference signal is known to be symmetric around the center frequency of the carrier c;
  receiving information of a half of the bandwidth of the frequency range $F_{RS}$, when a position of the reference signal is known to be symmetric around the center frequency of the carrier c;
  receiving information of the bandwidth of the frequency range $F_{RS}$ and an offset value from a predetermined frequency of the carrier c;
  receiving information of the positions on which the reference signal is not transmitted, and signalling information on the total bandwidth of carrier c; and
  receiving information of both resources used as reference resources for channel quality reporting and information directly related to the resources of the reference signal.

8. The method according to claim 1, further comprising:
receiving, by the apparatus, in the communications system, a non-contiguous configuration of the reference signal within the frequency range $F_{RS}$ by receiving a bitmap, wherein each bit in the bitmap refers to a resource among the set of resources utilized or not utilized by the non-contiguous reference signal.

9. An apparatus for arranging transmissions on a downlink carrier c spanning a frequency range $F_c$ in a mobile radio communications system, wherein a bandwidth of $F_c$ belongs to a set of predefined channel bandwidths in the communications system, and wherein the carrier c comprises a reference signal defined in the communications system, the apparatus comprising:
  a processor; and
  a computer readable medium coupled to the processor and storing thereon computer-executable instructions that when executed by the processor, configure the apparatus to:
    receive information associated with a configuration of a frequency range $F_{RS}$, wherein the carrier c is deployed over a frequency range F which is smaller than $F_c$ and within $F_c$ when any other transmissions on the carrier c are arranged to be within F, and $F_{RS}$ is a configurable frequency range which comprises a set of resources for comprising the reference signal of the carrier c.

10. The apparatus according to claim 9, wherein $F_{RS}$ is adjusted within F.

11. The apparatus according to claim 9, wherein the carrier c is configured as an aggregated carrier having a control channel on a carrier different from carrier c in the communications system.

12. The apparatus according to claim 9, wherein a bandwidth of the frequency range $FRS$ is restricted to a multiple of a smallest entity used for signalling downlink resource allocations in the communications system.

13. The apparatus according to claim 9, wherein the computer readable medium coupled to the processor and storing thereon computer-executable instructions that when executed by the processor, further configure the apparatus to:
  receive, in the communications system, a non-contiguous configuration of the reference signal within the frequency range FRS by receiving a bitmap, wherein each bit in the bitmap refers to a resource among the set of resources utilized or not utilized by the non-contiguous reference signal.

14. The apparatus according to claim 9, wherein the apparatus is further configured to receive signalling of resources defined as reference resources for channel quality reporting, wherein the frequency range of the resources defined as reference resources for channel quality reporting contains the frequency range $F_{RS}$.

15. The apparatus according to claim 9, wherein receiving information associated with the configuration of the frequency range $F_{RS}$ comprises one of the following:
  receiving information of the set of resources on which the reference signal is transmitted;
  receiving information of the bandwidth of the frequency range $F_{RS}$, when a position of the reference signal is known to be symmetric around the center frequency of the carrier c;
  receiving information of a half of the bandwidth of the frequency range $F_{RS}$, when a position of the reference signal is known to be symmetric around the center frequency of the carrier c;
  receiving information of the bandwidth of the frequency range FRS and an offset value from a predetermined frequency of the carrier c;
  receiving information of the positions on which the reference signal is not transmitted, and signalling information on the total bandwidth of carrier c; and
  receiving information of both resources used as reference resources for channel quality reporting and information directly related to the resources of the reference signal.

16. A non-transitory computer-readable medium having processor-executable instructions for arranging transmissions on a downlink carrier c spanning a frequency range $F_c$ in a mobile radio communications system, wherein a bandwidth of $F_c$ belongs to a set of predefined channel bandwidths in the communications system, and the carrier c comprises a reference signal defined in the communications system, wherein the processor-executable instructions, when executed, facilitate performance of the following:
  receiving information associated with a configuration of a frequency range $F_{RS}$, wherein the carrier c is deployed over a frequency range F which is smaller than $F_c$ and within $F_c$ when any other transmissions on the carrier c are arranged to be within F, and $F_{RS}$ is a configurable frequency range which comprises a set of resources for comprising the reference signal of the carrier c; and
  using the information for transmission.

17. The medium according to claim 16, wherein $F_{RS}$ is adjusted within F.

18. The medium according to claim 16, wherein the carrier c is configured as an aggregated carrier having a control channel on a carrier different from carrier c in the communications system.

19. The medium according to claim 16, wherein the processor-executable instructions, when executed, facilitate performance of:

receiving, in the communications system, a non-contiguous configuration of the reference signal within the frequency range FRS by receiving a bitmap, wherein each bit in the bitmap refers to a resource among the set of resources utilized or not utilized by the non-contiguous reference signal.

20. A communications system for arranging transmissions on a downlink carrier c spanning a frequency range $F_c$ comprising a base station and a terminal, wherein a bandwidth of $F_c$ belongs to a set of predefined channel bandwidths in the communications system, wherein the carrier c comprises a reference signal defined in the communications system, and wherein:
- the base station is configured to signal information associated with a configuration of a frequency range $F_{RS}$, wherein the carrier c is deployed over a frequency range F which is smaller than $F_c$ and within $F_c$ when any other transmissions on the carrier c are arranged to be within F, and $F_{RS}$ is a configurable frequency range which comprises a set of resources for comprising the reference signal of the carrier c; and
- the terminal is configured to receive the information associated with the configuration of the frequency range $F_{RS}$ and use the information for transmission.

21. The communications system according to claim 20, wherein FRS is adjusted within F.

22. The communications system according to claim 20, wherein the carrier c is configured as an aggregated carrier having a control channel on a carrier different from carrier c in the communications system.

23. The communications system according to claim 20, wherein the terminal is further configured to:
receive, in the communications system, a non-contiguous configuration of the reference signal within the frequency range FRS by receiving a bitmap, wherein each bit in the bitmap refers to a resource among the set of resources utilized or not utilized by the non-contiguous reference signal.

24. The communications system according to claim 20, wherein the terminal configured to receive the information associated with the configuration of the frequency range $F_{RS}$ comprises one of the following:
- the terminal configured to receive information of the set of resources on which the reference signal is transmitted;
- the terminal configured to receive information of the bandwidth of the frequency range $F_{RS}$, when a position of the reference signal is known to be symmetric around the center frequency of the carrier c;
- the terminal configured to receive information of a half of the bandwidth of the frequency range $F_{RS}$, when a position of the reference signal is known to be symmetric around the center frequency of the carrier c;
- the terminal configured to receive information of the bandwidth of the frequency range $F_{RS}$ and an offset value from a predetermined frequency of the carrier c;
- the terminal configured to receive information of the positions on which the reference signal is not transmitted, and signalling information on the total bandwidth of carrier c; and
- the terminal configured to receive information of both resources used as reference resources for channel quality reporting and information directly related to the resources of the reference signal.

* * * * *

UNITED STATES PATENT AND TRADEMARK OFFICE
CERTIFICATE OF CORRECTION

PATENT NO. : 10,750,505 B2  
APPLICATION NO. : 16/192056  
DATED : August 18, 2020  
INVENTOR(S) : Branislav M. Popovic and Fredrik Berggren Page 1 of 1

It is certified that error appears in the above-identified patent and that said Letters Patent is hereby corrected as shown below:

In the Specification

Column 1, Line 13-14, delete "afore-mentioned" and insert -- aforementioned --, therefor.

In the Claims

Column 17, Line 67, Claim 12, delete "F$RS$" and insert -- $F_{RS}$ --, therefor.

Column 18, Line 34, Claim 15, delete "FRS" and insert -- $F_{RS}$ --, therefor.

Column 19, Line 27, Claim 21, delete "FRS" and insert -- $F_{RS}$ --, therefor.

Signed and Sealed this  
Twenty-ninth Day of December, 2020

Andrei Iancu  
*Director of the United States Patent and Trademark Office*